Jan. 17, 1961 O. MYERS 2,968,700

TELEPHONE INTERCEPT SYSTEM

Filed Nov. 25, 1959 2 Sheets-Sheet 1

INVENTOR
O. MYERS
BY
ATTORNEY

INVENTOR
O. MYERS
BY [signature]
ATTORNEY

United States Patent Office 2,968,700

Patented Jan. 17, 1961

2,968,700

TELEPHONE INTERCEPT SYSTEM

Oscar Myers, Mount Vernon, N.Y., assignor to Bell Telephone Laboratories, Incorporated, New York, N.Y., a corporation of New York Filed Nov. 25, 1959, Ser. No. 855,437

22 Claims. (Cl. 179—27)

Figure 1:
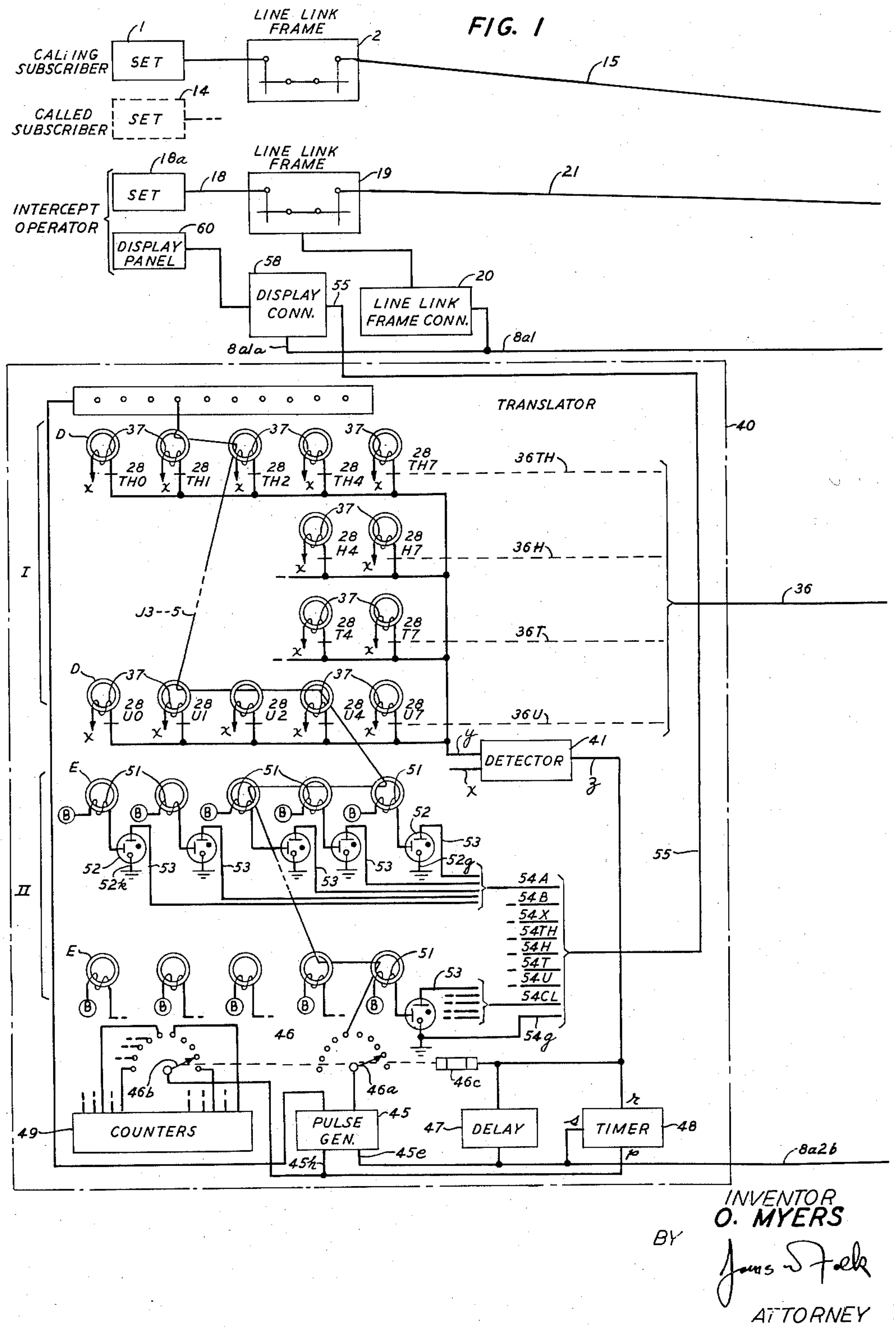

This invention relates to automatic telephone switching systems and more particularly to an improvement in telephone intercept service obtained by the provision of an intercept translating apparatus.

While the use of multifunctional telephone switching apparatus, such as the marker circuit for No. 5 Crossbar telephone systems, as described in Patent 2,585,904, issued February 19, 1952, to A. J. Busch, has resulted in efficient and economical telephone system operation, the intercept aspect of telephone service has continued to depend heavily upon human operator control.

Under presently existing telephone practice, when a subscriber either moves to a different address or requests and receives a different class of telephone service, it is often necessary to assign such subscriber one or more new directory numbers. For an indeterminate period after the new number has been assigned persons uninformed of the change will continue to attempt to reach this subscriber by dialing the old number. During this period the old number may not be reassigned to a different subscriber and, accordingly, the terminal points of the switching equipment associated with the old number must remain unavailable for use. Heretofore, there has been no convenient method available for gathering data to determine when traffic to the old number has decreased to the point where a reassignment is permissible, and reassignments have heretofore been made on the basis of general operating experience without reference to the traffic pattern characteristics of the individual line.

When a change in a subscriber's directory number is made it is desirable to inform those dialing the old number of the new directory number and, in some cases, of any change in the type of service provided. For example, the called party's new exchange may now be in a different toll area or the called party may have acquired one or more new directory numbers. For these purposes, the calling party is presently routed to an intercept operator who must ask for the number dialed and consult a changed number directory in order to determine the new number and associated service information. Since even a few minutes delay between the actual change of service and the printing and distribution of the changed number directories among the intercept operators will degrade the quality of intercept service, and since the perusal of such directories by the operator takes appreciable time, it is desirable to eliminate or at least to minimize their usage in modern telephone offices.

The automatic routing of a calling party to an intercept operator is initiated when the marker, after seizing the number group to obtain the equipment location of the terminals corresponding to the dialed directory number, fails to obtain the equipment location of the called party's line. The number group will fail to give an equipment location because one or more of the "jumpers" which are normally provided between the terminal points in the number group corresponding to the dialed directory number have been disconnected. The marker is provided with a timing circuit to initiate the intercept switching connections when the number group fails to supply an equipment location within a specified time interval. The sequence of switching operations thus initiated includes the operation of route relays to release the called number information in the dialed number register relays of the marker and to release the number group associated with the disconnected number. Since the intercept trunks (like P.B.X trunks, for example) are advantageously brought out to terminals on line link frames, the marker proceeds as for a terminal hunting line, except that the initiated sequence of route relay operation effects the entry into the marker dialed number register of a four-digit number associated with the intercept trunks, instead of the last four digits of a dialed P.B.X number. This four-digit number controls an appropriate number group to furnish the marker the equipment location of an idle intercept trunk on an idle line link frame. The marker then proceeds to establish a connecting path between the calling party and the intercept operator in the same manner as if the intercept operator's trunk were an ordinary subscriber's line on the selected line link frame.

To efficiently exploit the multifunctional control characteristics of the marker it is essential that individual circuits within the marker retain maximum flexibility and be used for additional control functions as soon as previous control functions have been completed. Accordingly, when the intercept switching operation is, as just described, accomplished on a similar basis to that of a call to a P.B.X line, the dialed number stored in the dialed number register of the marker (which number is no longer useful for number group control) is erased so that the marker register will be available to store the four-digit number associated with the intercept trunks. The erasure of the called number information has therefore been heretofore considered desirable from the standpoint of marker circuit operation, existing telephone switching circuits being incapable of extracting any further useful function therefrom.

Accordingly, it is an object of the present invention to effect an improvement in telephone intercept service.

It is another object of the present invention to facilitate the efficient reassignment of telephone directory numbers.

It is still another object of the present invention to improve the accuracy and speed of dialed-number to changed-number translation.

It is a still further object of the present invention more efficiently to utilize the data processed in multifunctional telephone switching circuits.

In accordance with the principles of the present invention, in one illustrative embodiment thereof, the dialed directory number of the called party is transferred from the marker dial register to an intercept translating circuit when the marker obtains an indication of a disconnected number condition from the number group. The intercept translating circuit matches the dialed directory number with the new directory number and service data and the new number and service information are routed to be displayed to the telephone intercept operator being connected to the calling party by the marker.

Further in accordance with the principles of the present invention, in one illustrative embodiment thereof, the intercept translator seized by the marker is provided with a plurality of magnetic rings similar to the type of ring disclosed in Patent 2,614,176, issued October 14, 1952, to T. L. Dimond. A group of jumpers links a first array of the magnetic rings according to predetermined patterns indicative of the old directory numbers of subscribers involved in directory number changes. Each of the jumpers also links a second array of magnetic rings in accordance with a further predetermined pattern indicative of the new directory number and corresponding service information. The jumpers are sequentially energized, signals induced in the output windings of the first array being multiplied through respective normally closed relay contacts to a detector circuit, the relay contacts being opened under the control of a dialed number register. The detector responds to the induced voltages to locate the jumper which threads the pattern of first array rings associated with the opened ones of the normally closed contacts and activates a pulse circuit to apply a high amplitude pulse to the selected jumper. The output windings of the second array linked by the selected jumper trigger electronic discharge devices controlling corresponding display lamps at the intercept operator's position, the connection of the translator output to the display panel of the intercept operator advantageously being made via a connector having an address corresponding to the line link frame selected by the marker in establishing the regular intercept connection between the calling party and the intercept operator.

Accordingly, it is a feature of the present invention that the registration of a superseded directory number in the marker initiate intercept switching functions to provide a normally selected intercept operator with the translated directory number of the called party.

It is another feature of the present invention that the marker seize a condensed array of translation circuit paths for the selective detection of a circuit path corresponding to the dialed number.

It is another feature of the present invention that signals derived by first selective energizations of a plurality of translation circuit paths determine the pattern of signals obtained upon a subsequent selective energization of the paths.

It is a further feature of the present invention to provide means for selectively matching a path linking predetermined ones of a plurality of magnetic elements with a pattern of actuated circuits individually associated with the elements.

It is another feature of the present invention that a common switch controlling marker assign the output of a seized intercept translator in accordance with the switching equipment location of a concurrently-seized intercept trunk.

Figure 2:
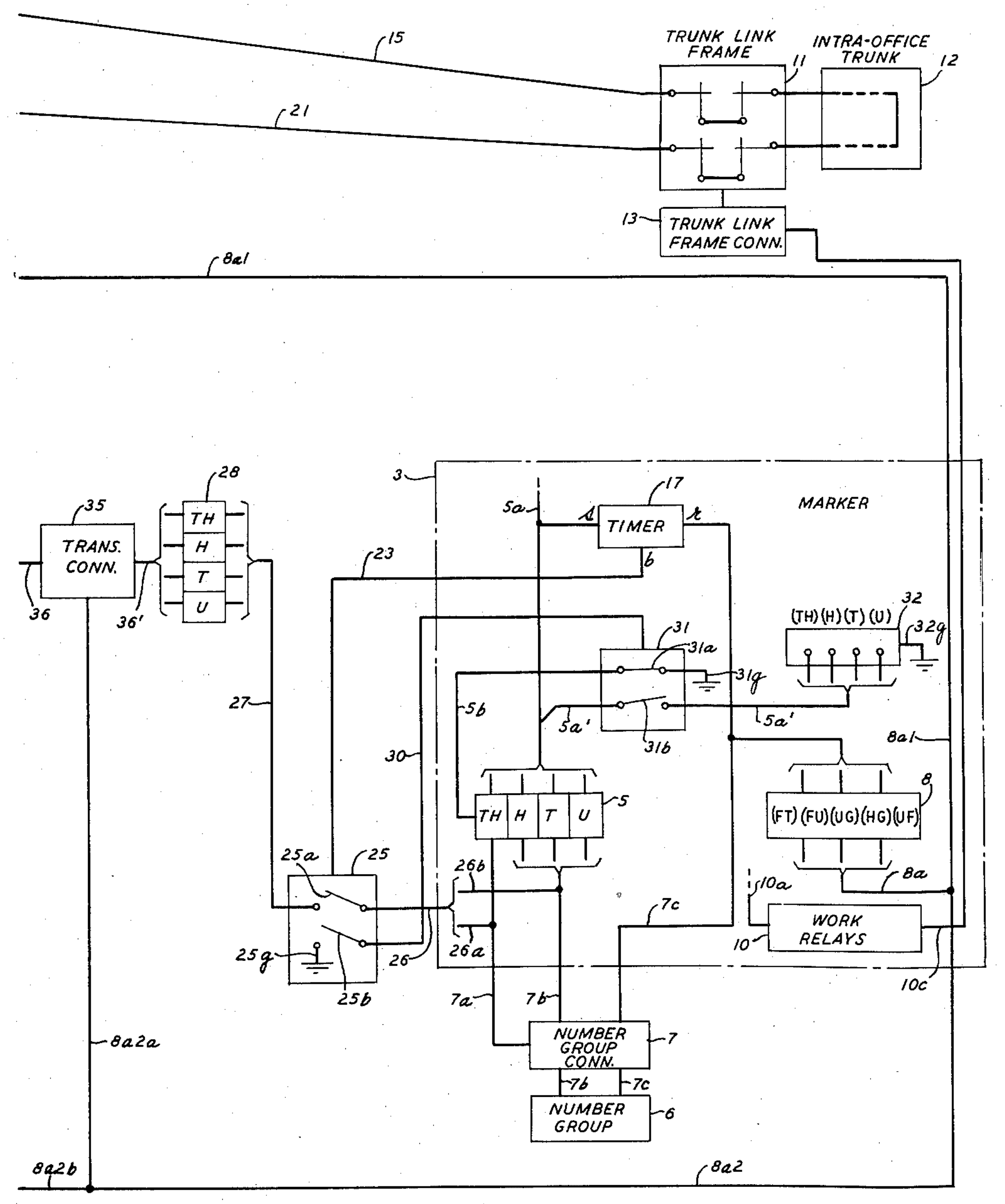

The foregoing and other objects and features of the present invention may be more readily understood from the following description when read with reference to the accompanying drawing, Figs. 1 and 2 of which when placed side by side illustrate in simplified schematic form an illustrative embodiment of an automatic, telephone-switching, intercept-translating system.

Referring now to the combined figures of the drawing, there is shown a portion of an automatic telephone switching system of the type generally described in the above-mentioned Patent 2,585,904, which system includes a plurality of calling subscribers' sets and line link frames of which only one calling set 1 and its associated line link frame 2 are shown to avoid undue complication of the drawing. The establishment of the dialing connections between the calling subscriber 1 and the originating register (not shown), the entry of the dialed number in the marker 3, and the examination of the office code by the marker to determine whether an intraoffice or outgoing call is involved will not be described herein being fully explained in the last-mentioned patent.

Assuming that the marker 3 has determined that an intraoffice call is desired, the last four digits of the dialed number are entered in register 5 via cable **5*a*. Substantially simultaneously therewith cable 10*a* is energized and marker work relays 10 proceed to locate and seize an idle trunk link frame 11 and intraoffice trunk 12 via trunk link frame connector 13**. For purposes of simplicity, the conditions corresponding to intraoffice calls will be described in detail, extension of the described conditions to outgoing calls becoming apparent therefrom.

The dialed number register 5 is shown in simplified schematic form and advantageously may employ any well-known scheme of digit representation. The register 5 is shown divided into four segments TH, H, T and U respectively representing the relay banks for registering the thousands, hundreds, tens and units digits of the dialed directory number. Advantageously the register 5 may employ a two-out-of-five code for registering each of the TH, H, T and U digits. In this case five relays are required per bank, of which two are actuated instead of the ten relays per bank (one actuated) required by a one-for-one (decimal) code. The relays of register 5 are advantageously actuated by the application of ground potential to eight leads in cable **5*a*, i.e., two energized leads for each of the four banks of relays when the two-out-of-five code is employed. The actuated relays are locked by the presence of ground potential on common latch line 5*b***.

The thousands digit relays in the TH bank of register 5, as described in the last-mentioned patent, control the selection of the appriopriate number group 6 which contains the thousand directory numbers beginning with the thousands digit registered in the TH relay bank of register 5. The actuated ones of the TH digit relays operate the number group connector 7 via cable **7*a* to complete circuit path 7*b* from the contacts of the actuated ones of the H, T and U relays of register 5 to the appropriate terminal strips (not shown) of the number group 6. The number group 6, in response to the dialed number information supplied over circuit path 7*b*, normally energizes the leads of cable 7*c* in accordance with a signal pattern representing the location of the switching equipment of the line corresponding to the dialed number. The switching equipment addresses provided by number group 6 are entered in the equipment location register 8 of the marker 3 over circuit path 7*c* which path 7*c* is completed by the operated connector 7. Register 8 energizes leads in cable 8*a* appropriate to the provided equipment location to seize and operate a line link frame (not shown) for the connection of the called subscriber's idle set such as set 14 to the intraoffice trunk 12. The line link frame 2 of the calling party is then seized by the marker 3 via a connector (not shown) and line link frame 2 is operated to connect the calling set 1 to the other end of the intraoffice trunk 12 via idle junctor 15**.

Under existing telephone system practice, however, when a new directory number is assigned to a subscriber, the jumper or jumpers (not shown) within the number group corresponding to the old directory number are disconnected. Accordingly, when the marker dialed number register 5 seizes such a number group, there will be no equipment location information available therein and the output circuit path associated with the seized number group, such as path **7*c***, will not be energized.

To detect the absence of equipment location information corresponding to the dialed directory number, a timer 17 is provided which is started by energization (grounding) of its terminal *s* by the grounded leads of cable **5*a* at the same time that the dialed number digits are entered in register 5. Timer 17** is normally reset when its terminal *r* is energized by the appearance of equipment location information on the energized leads of cable **7*c*. On the other hand, when the equipment location information is not provided on circuit path 7*c* within the predetermined operating interval of timer 17**, terminal *b* of timer 17 will be energized.

Under previous intercept arrangements, energization of terminal *b* initiates a sequence of switching operations similar to P.B.X terminal hunting in which the locking ground potential is temporarily removed from latch line **5*b* to release the actuated relays of dialed number register 5. Thereupon the seized number group 6** is released and a new number, analogous to a P.B.X trunk group number, but in this case corresponding to an intercept trunk designation, is entered in register 5 by grounding appropriate leads in cable 5a. With the new number entered in register 5, a number group having intercept trunk address information, which number group may be either number group 6 or another number group having intercept trunk translations, is seized. The appropriately seized number group then provides the intercept trunk equipment location information to register 8 over circuit path 7c. Since the intercept trunks, such as trunk 18 in Fig. 1, all terminate on line link frames, such as frame 19, the seizure of an intercept trunk is quite similar to seizure of a called party line such as described above in the case of called subscriber 14. Register 8 energizes leads in cable 8a to seize and activate a designated frame and trunk. For example, energizing the leads of sub-cable 8a1 of cable 8a actuates the connector 20 associated with the idle line link frame 19 and operates frame 19 to connect idle intercept trunk 18 to intraoffice trunk 12 via junctor 21 as determined by the equipment location information entered in register 8.

When the calling subscriber's set 1 is connected via trunk 18 to the intercept operator's set 18a, it is necessary for the operator to ask for the directory number just dialed by the calling subscriber, to consult a changed number directory and then to inform the calling subscriber of the called party's new directory number.

An improvement in intercept service is obtained in accordance with the present invention by connecting the output terminal *b* of timer 17 via control lead 23 to actuate transfer switch 25. Accordingly, when the number group seized by the actuated relays of the dialed number register 5 fails to provide equipment location information over path 7c, timer 17 will energize its output terminal *b*, lead 23 and thereby operate transfer switch 25. The transfer switch 25 contains two sets of contacts; the first set 25a closes a short time before the second set 25b. While only one contact of the set 25a is shown for simplicity it is to be understood that the set 25a provides a number of simultaneously operated contacts equal to the number of relays in register 5. For example, when register 5 employs the above-mentioned two-out-of-five code for representing the TH, H, T and U digits, there will be twenty contacts in the group 25a and twenty leads in cable 26, of which eight leads and eight contacts will be energized by the actuated relays of register 5. When contacts 25a are closed a circuit path is provided from the contacts of the actuated TH, H, T and U relays of register 5, over cables 7a and 7b, 26a and 26b, 26, the contacts of set 25a and cable 27 to actuate holding register 28. Holding register 28 is advantageously of the same configuration as register 5, except that the leads of output cable 36′ are advantageously connected to the respective back contacts of the relays in register 28 whereas the corresponding leads of output cables 7a and 7b are connected to front contacts of register 5.

After a short time sufficient for register 28 to be set in accordance with the dialed number information provided by register 5, contact set 25b closes to apply potential 25g to lead 30 to operate switch 31. When switch 31 is operated by the energization (grounding) of lead 30, normally closed contacts 31a are opened momentarily, are then reclosed, and a short time later normally opened contacts 31b are closed. The momentary opening of contacts 31a removes locking (ground) potential 31g from latch line 5b releasing all of the priorly actuated relays of register 5. Contacts 31a then reclose making locking potential 31g once again available to latch line 5b. Contacts 31b are then momentarily closed to transfer an intercept trunk designation from terminal board 32 to register 5 via circuit path 5a′.

While only one contact 31b is shown for simplicity, it is to be understood that a plurality of contacts equal in number to that required to designate an intercept trunk number is provided. For example, where an intercept trunk as in the case of a P.B.X trunk is designated by a four-digit number, and where a two-out-of-five code register 5 is used, cable 5a′ has eight leads, one for each of two TH, H, T and U relays in register 5, and accordingly, set 31b consists of eight contacts. The eight contacts of set 31b and the eight leads of cable 5a′ are energized by potential 32g applied to terminal board 32 which potential 32g is of the same magnitude and polarity (e.g., ground potential) as that applied to cable 5a in the above-described normal operation of register 5. The closing of the contacts 31b operates specific TH, H, T and U relays in register 5 which will be locked due to the presence of locking potential on latch line 5b. The operated TH relay of register 5 will then control the seizure of an appropriate number group having the switching equipment addresses of intercept trunks. For simplicity, it will be assumed that priorly-used number group 6 has such intercept trunk information and number group 6 will accordingly again be seized. The TH relays will activate cable 7a to operate the number group connector 7 associated with number group 6 to enter over path 7b the H, T and U designations of the intercept trunk in the seized number group 6. The number group 6 will energize path 7c in accordance with the equipment location of the intercept trunk corresponding to the designation provided by register 5 from terminal board 32, and the equipment location of the intercept trunk will be entered in register 8.

Register 8 energizes leads in cables 8a and 8a1 appropriate to the provided equipment location of the intercept trunk 18 to seize and operate line link frame 19 to connect the intercept operator's idle set 18a to the intraoffice trunk 12 via junctor 21. The line link frame 2 of the calling party is then seized by the marker 3 via a connector (not shown) as described above in normal switching system operation, and line link frame 2 is operated to connect the calling subscriber's set 1 to the other end of the intraoffice trunk 12 via junctor 15.

In addition to the selection of an idle intercept trunk 18 and the energization of cables 8a and 8a1 to control line link frame 19 to establish the talking connection between the calling subscriber's set 1 and the intercept operator's set 18a, register 8 energizes additionally provided sub-cable 8a2. The additionally provided energized cable 8a2, the leads of which advantageously are connected to contacts of register 8 corresponding to cable 8a1, operates translator connector 35 via lead 8a2a and contains energized lead 8a2b which is connected to translator 40.

When translator connector 35 is operated, a multiple circuit path 36′—36 is completed between the above-mentioned back contacts of each of the relays of register 28 and the corresponding points 36 (TH, H, T, U) (0, 1, 2, 4, 7) of the magnetic ring number field array 1 of translator 40. Thus, for example, assume that the holding register 28 is to store the last four digits of a dialed number such as 3– –5, where the dashes indicate any two arbitrarily dialed hundreds and tens digits. The TH1 and TH2 relays of the TH relay bank of register 28 will be actuated in response to the thousands digit 3 of the dialed number, and accordingly the back contacts 28TH1 and 28TH2 will open-circuit leads TH1 and TH2 of cable 36TH. Similarly, back contacts of the two actuated relays of each of the H and T relay banks of register 28 will open-circuit two leads in each of cables 36H and 36T in accordance with the arbitrarily-dialed hundreds and tens digits. The units digit 5 of dialed number 3– –5 similarly actuates the back contacts 28U1 and 28U4 of the U digit relays of register 28 to open-circuit leads U1 and U4 of cable 36U.

The number field array I of translator 40 comprises a plurality of magnetic rings D of the type described in Patent 2,614,176. The rings of array I are arranged in rows corresponding respectively to the TH, H, T and U relay banks of register 28. Each of the rings D is provided with an output winding 37, one end x of which is multipled together with the correspondingly designated ends x of the other output windings 37 of array I to the x input of detector 41. The other end of each output winding 37 is connected to a corresponding back contact in register 28 via respective leads in cable 36 and respective contacts in connector 35.

Accordingly, upon the registration of dialed number 3--5 in register 28 and operation of connector 35, the output coils 37 of the TH1, 2; H-, -; T-, -; and U1, 4 rings of array I are disconnected from the input of detector 41.

Simultaneously with the operation of connector 35 by the energized lead 8a2a, terminal 45e of pulse generator 45 and terminal s of timer 48 is energized by branch lead 8a2b of cable 8a2. Energization of terminal 45e causes pulse generator 45 to apply a low amplitude current pulse to the arm 46a of selector switch 46. Arm 46a normally will be engaged with a contact of the switch 46 to which contact a jumper (not shown) other than the desired jumper J3--5 is connected. Accordingly, the application of the low amplitude current pulses to such other jumper (not shown) will induce a low amplitude voltage in each of the output coils 37 associated with the rings D of array I through which such other jumper is threaded.

Since none of the jumpers except J3--5 threads all rings associated with the disconnected output windings 37, the non-actuated back contacts associated with the rings D through which each non-desired jumper is connected will complete one or more parallel circuits from the energized output coils 37 of the threaded rings to the x and y inputs of detector 41. Detector 41 will, in response to the low amplitude voltage applied between its x and y terminals, energize detector output lead z. Energization of lead z will actuate operating coil 46c of selector switch 46 to advance arm 46a to the next contact. Delay switch 47 energizes terminal 45e of pulse generator 45 after a delay interval sufficient to allow for the stepping of arm 46a. Terminal 45e having again been energized, pulse generator 45 will apply a low amplitude current pulse to arm 46a and the jumper connected to the newly selected terminal of switch 46.

The successive pulsing of jumpers, detection of voltages induced in the output windings 37, and the advancement of selector arm 46a continues until arm 46a is connected to deliver a low amplitude current pulse to the jumper threading the rings of array I corresponding to the number registered in register 28, i.e., the jumper threading only those of rings D associated with actuated back-contacts of register 28.

The application of a low amplitude current pulse to the desired jumper, such as jumper J3--5, threading rings D corresponding to the number stored in register 28 will result in the development of an E.M.F. in each of the output windings 37 associated with the rings threaded by jumper J3--5. However, the back contacts in series with the output windings 37 of each of the rings threaded by jumper J3--5 are operated by the correspondingly actuated relays in register 28. Accordingly, the opening of the back contacts disconnects all of the windings 37 having induced voltages from terminals x and y of detector 41. Timer 48 which is started when its terminal s is energized by lead 8a2b will accordingly receive no signal on its reset input terminal r since detector output z will not be energized. After a predetermined time interval, timer 48 will provide an output pulse on its terminal p to energize terminal 45h of pulse generator 45 and arm 46b of selector switch 46. Arm 46b is moved in step with arm 46a to selectively actuate the one of the counters 49 corresponding to the dialed number, thereby providing for each superseded number an individual traffic count to facilitate the efficient reassignment of the directory number involved.

Energization of terminal 45h of pulse generator 45 causes pulse generator 45 to deliver a high amplitude current pulse to arm 46a of switch 46. While the application of the high amplitude current pulse to arm 46a will cause a high amplitude voltage to be developed in each of the output windings 37 of array I linked by jumper J3--5, the energized windings are disconnected from terminals x and y and detector 41 will not be activated. However, a high amplitude voltage will be developed in the output coils 51 of the rings E of number field array II linked by jumper J3--5 which voltage is applied to the trigger electrode of an associated electron discharge device 52, such as the gas tubes described in the above-mentioned Patent 2,614,176. Each output coil 51 is provided with a source of potential B for its associated gas tube 52. The main conduction electrode of each gas tube 52 is connected to a respective lead 53 in the output cable 55 through which lead a main electrode potential is advantageously provided.

A number of rows of rings E are provided in array II of which only the first row corresponding to the "A" digit of the new directory number and the last row corresponding to a service class designation "CL" are shown. The individual leads 53 of the first row of tubes 52 are shown grouped in the cable 54A of cable 55. Similarly, the leads 53 of the second and succeeding rows are grouped in cables 54 (B, X, TH, H, T, U and CL) of output cable 55. The rings E of array II are advantageously threaded by the jumpers connected to the contacts of selector switch 46a according to a two-out-of-five pattern to take advantage of the saving in the number of rings which are afforded by the utilization of the two-out-of-five code.

The number of turns provided in output windings 51 are adjusted so that tubes 52 will not be triggered by the low amplitude voltage developed when a jumper threading a ring E is energized with a low amplitude current. The number of turns is, however, chosen such that the voltage induced in response to a jumper energized with a high amplitude current pulse will be sufficient to trigger the associated gas tube 52.

Equally advantageous results may, however, be obtained by providing the same number of turns on windings 37 and 51 and by connecting delay circuit 47, timer 48 terminal s and sub-cable 8a2b to pulse generator terminal 45h, terminal 45e being disconnected. In this case, a set of normally-open relay contacts (operated by the energization of timer 48 terminal p) would be placed in the cathode circuits 52k to prevent tubes 52 from firing until the desired jumper is selected. Timer 48 terminal p and selector arm 46b would be connected to generator terminal 45h via a diode (not shown) or other suitable isolation device to prevent operation of counters 49 when terminal 45h is energized by delay circuit 47 or cable 8a2b prior to the selection of the desired jumper. Cable 55 is connected to display connector 58 which is actuated by energization of branch lead 8a1a of cable 8a1 at the same time that line link frame connector 20 is operated by energization of cable 8a1. Operation of display connector 58 completes a circuit path between output cable 55 and display panel 60 which panel is physically located so as to be viewable by the intercept operator associated with set 18a.

Display panel 60 advantageously comprises a plurality of numerical indicating tubes of the type described in the May 1956 issue of Communication and Electronics at page 239. Display panel 60 is accordingly advantageously provided with a suitable translator (not shown) for converting the two-out-of-five code information supplied over cable 55 to one-out-of-ten selections required by the aforementioned display tubes. On the other hand, five additional rings E (not shown) advantageously may be added to each row of array II of translator 40 so that the jumpers, such as J3--5, thread only one ring in each row. When the rings E of array II are arranged in the last-mentioned, or one-for-one code, no additional translator need be included in display panel 60 to operate the above-mentioned display tubes. In either event, display panel 60 advantageously includes potential sources (not shown) for each of the main discharge anode circuits of cable 55.

Accordingly, it is seen that the above-described intercept translating system embodiment of the present invention makes more efficient utilization of input data by employing the dialed number digits (after they would have normally been discarded by previous telephone switching systems) to provide the intercept operator selected by the marker with additional information relating to the status of the called number. In addition, the dialed number register of the marker is rapidly freed for use on subsequent calls thereby maintaining marker circuit flexibility.

While the number of subscribers involved at any one time with directory number reassignments will normally be but a small fraction of the number of subscribers served by a telephone office, there is no way of predicting which of all the directory numbers will be changed. Accordingly, it is desirable that the dialed number translator be capable of economically translating any of the normally assigned directory numbers in the office. It is an additional advantage of the herein disclosed mode of sequentially matching translator jumpers to the pattern of actuated register relays that a considerable saving in the number of relay contacts is achieved. Thus, in a central office having 10,000 lines, only 200 of which have been assigned new directory numbers, the relay tree selection method (such as that described in Patent 2,585,504 used to select jumpers in the number groups) would necessitate the use of 10,000 relay contacts, of which only 200 would ever be usefully engaged. On the other hand, by the use of the sequential matching circuit herein described only as many contacts need be provided as there are subscribers having newly assigned directory numbers, a savings in the illustrative example of 9800 contacts.

While the above-identified system has been explained on an analogous basis to that used in P.B.X terminal hunting, it is of course obvious that instead of following the practice of disconnecting the jumper in the number group associated with a disconnected party, the jumper may be rerun so that the number group will directly provide the equipment location of an intercept trunk. In this latter case, the terminal board 32, cable **5*a'* and timer 17 would not be required; transfer of the dialed digits from marker 3 to translator 40 being accomplished by connecting lead 23 of transfer switch 25 to cable 8*a*** instead of to terminal *b* of timer 17.

In addition, where the dialed number register 5 has available back contacts, and where the need for marker circuit flexibility is not as great, holding register 28 may be omitted. In this case, the back contacts of register 5 rather than the contacts of holding register 28 are directly associated with the output windings 37 of array I of translater 40.

It is to be understood that the above-described arrangements are illustrative of the application of the principles of this invention. Numerous other arrangements may be devised by those skilled in the art without departing from the spirit and scope of the invention.

What is claimed is:

1. In a telephone switching system the combination comprising a common switch controlling marker having a register for storing dialed directory numbers, first circuit means coupled to said register for initiating intercept switching connections in said marker in response to predetermined ones of said dialed numbers, a translator having an input and an output, second circuit means coupled to said first circuit means and responsive to the initiation of said intercept connections for transferring said predetermined numbers to said translator input, display means, and third circuit means controlled by said marker intercept switching connections for connecting said translator output to said display means.

2. In a telephone switching system according to claim 1, the combination wherein said first circuit means includes timing means and register latch circuit means controlled by said timing means.

3. In a telephone switching system according to claim 2, the combination wherein said second circuit means includes switch means for operating said latch circuit means.

4. In a telephone switching system according to claim 3, the combination wherein said first circuit means includes means controlled by said switch means for entering an intercept designation in said register.

5. A switching intercept translating system comprising a number register, means for entering directory numbers in said register, a plurality of switch locations, display means associated with said switch locations, a number group associated with said register for correlating said directory numbers with said switch locations, a translator for correlating predetermined ones of said directory numbers with at least a further directory number, transfer means responsive to said predetermined numbers for connecting said register to said translator, and switching means controlled by said number group for connecting said translator to transmit said further number to said display means.

6. A switching intercept system according to claim 5 wherein said transfer means includes means for releasing said predetermined numbers from and entering additional numbers in said register.

7. A switching intercept system according to claim 6 wheren said number group controls said switching means in accordance with said additional numbers.

8. A telephone switching system comprising a plurality of telephone circuit switches, a transfer switch, a number group having switch operating instructions corresponding to active and to inactive directory numbers, first route means controlled by said number group for operating said circuit switches corresponding to said active numbers, means controlled by said number group for operating said transfer switch in accordance with said inactive numbers, number field means actuated by said transfer switch for associating said inactive with newly-active directory numbers, second route means controlled by said transfer switch for operating said circuit switches corresponding to said inactive numbers, and means coupled to said number field means for associating said newly-active numbers with said last operating circuit switches.

9. A telephone switching system according to claim 8 wherein said number field means comprises a first magnetic ring array for receiving said inactive numbers, a second magnetic ring array for transmitting said newly-active numbers, at least one input circuit path common to said first and to said second array, and pulse means for selectively energizing said circuit path.

10. A telephone switching system according to claim 9 wherein said number field means further comprises detector means coupled to said first array for controlling said pulse means.

11. A telephone switching system according to claim 10 further comprising display means connected to said last operating switches and responsive to said pulse means in a controlled condition for displaying said newly-active numbers.

12. In a telephone call intercepting system, means for matching a translation circuit path to a dialed interceptible number comprising a dialed number register, a field of inductive elements, a plurality of circuit path terminals for coupling a respective circuit path to said field in accordance with an interceptible number, detector means, circuit means individually coupling said elements to said detector, switch means controlled by said register for opening particular ones of said circuit means in accordance with the number registered in said register, and signal means for sequentially energizing said terminals.

13. In a telephone call intercepting system according to claim 12, said signal means having a first and a second input and an output connection, said output being selectively energizable by each said input, delay circuit means connected to said detector for energizing said first input connection, timing means connected to said detector for energizing said second input connection, and selector means for connecting said output to said terminals.

14. In a telephone call intercepting system according to claim 13, said field having a first and a second portion, said path being coupled to said first portion in accordance with a pattern representing said interceptible number and to said second portion in accordance with a pattern representing a replacement number, said circuit means coupling said elements of said first portion to said detector, and indicating means connected to said inductive elements of said second portion for displaying said replacement number.

15. In a telephone call intercepting system according to claim 14, said indicator means comprising a plurality of discharge elements responsive to said selectively energizable signal means output.

16. In a telephone switching system for the temporary routing of a calling subscriber to an intercept station when the number dialed is superseded by a further directory number, the combination comprising a register for storing the number dialed, translator means coupled to said register for deriving said further directory number corresponding to said number dialed, number display means associated with said station, and connector means for routing said further number to said display means.

17. In a telephone switching system according to claim 16 a common switch controlling marker having an equipment location register, input circuit means connected to said translator for initiating translator operation, and first cable means connected to said location register for energizing said input circuit means.

18. In a telephone switching system according to claim 17 a selected plurality of switches controlled by said location register for effecting said temporary routing, and second cable means connected to said switches for operating said connector means.

19. In a telephone system having means for registering dialed directory numbers and means for establishing connections in response to said dialed numbers, intercept apparatus comprising means for recognizing and registering inactive dialed directory numbers, means responsive to such inactive numbers for enabling said establishing means to establish a connection to an intercept operator position, display means at said operator position, and means responsive to said inactive directory number for providing to said display means to corresponding new active directory number for said inactive directory number.

20. In a telephone system in accordance with claim 19, said last mentioned means comprising a translator having a first and a second magnetic ring array, an input wire threading said first array in accordance with each inactive number and said second array in accordance with the corresponding new active number, output means for each magnetic ring in said first array including an output winding and normally closed contact means, means for energizing said contact means in accordance with the registered inactive directory number, output means for each magnetic ring in said second array, and means responsive to said second array output means for energizing said display means.

21. In a telephone system in accordance with claim 20, the combination further comprising means for sequentially applying a first signal to said input wires, means connected to said first array output means and responsive to said first signals for recognizing said registered inactive directory number, and means connected to said recognizing means for applying a second signal to said input wire corresponding to said registered inactive directory number.

22. In a telephone system in accordance with claim 21 wherein said first signal comprises a current pulse of lesser amplitude than said second signal, said means responsive to said second array output means for energizing said display means comprising means responsive to said greater amplitude second signal and non-responsive to said lesser amplitude first signal.

No references cited.